United States Patent [19]
Karamata

[11] Patent Number: 6,085,871
[45] Date of Patent: Jul. 11, 2000

[54] LUBRICATION SYSTEM FOR A MECHANISM, IN PARTICULAR FOR A ROTARY BEARING IN A SPACECRAFT

[75] Inventor: Boris Karamata, Epalinges, Switzerland

[73] Assignee: Agence Spatiale Europeene, Paris Cedex, France

[21] Appl. No.: 09/150,299

[22] Filed: Sep. 9, 1998

[30] Foreign Application Priority Data

Sep. 10, 1997 [FR] France .................................... 97 11229

[51] Int. Cl.⁷ ....................................................... F16N 29/00
[52] U.S. Cl. ............................. 184/75; 184/79; 222/333; 222/378; 137/807; 417/417
[58] Field of Search ...................... 184/32, 27.1, 27.4, 184/79, 75; 222/333, 378; 137/807; 251/355, 129.06; 417/417, 489

[56] References Cited

U.S. PATENT DOCUMENTS

| | | |
|---|---|---|
| 2,301,130 | 11/1942 | Valley .................................... 184/27.4 |
| 2,540,523 | 2/1951 | Horn ........................................ 184/75 |
| 2,996,149 | 8/1961 | Walker .................................. 184/27.4 |
| 5,630,709 | 5/1997 | Bar-Cohen .............................. 417/417 |
| 5,782,616 | 7/1998 | Yoo ...................................... 184/27.1 |

*Primary Examiner*—Tamara L. Graysay
*Assistant Examiner*—Chong H. Kim
*Attorney, Agent, or Firm*—Oblon, Spivak, McClelland, Maier & Neustadt, P.C.

[57] ABSTRACT

The invention relates to a lubrication system for a mechanism (27), on-board a spacecraft. It comprises a non pressurized tank (20) communicating with the mechanism (27) via a tube (220). A piston (23) closes the tube (220) while the mechanism is at rest. The piston (23) is controlled by a first spring (5) and by a second, shape memory, spring (24) opposing the latter, which lengthen by thermal effect. A controller (25, 26) supplies this spring with a current (I) to actuate it. An annular element(7), pushed by a cylindrical spring (6), defines a capillarity filled pumping chamber (22). When the temperature of the shape memory alloy (24) falls back below a threshold, the spring (24) recovers its original shape, the first spring (5) pushes back the piston (23) and expels a dose of lubrication fluid (4).

10 Claims, 5 Drawing Sheets

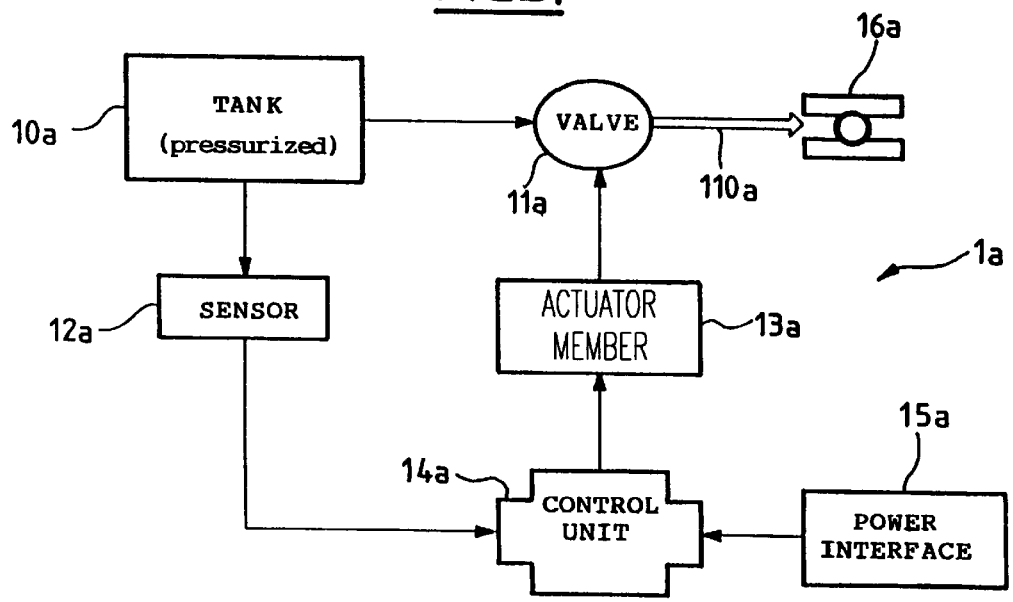
FIG_1
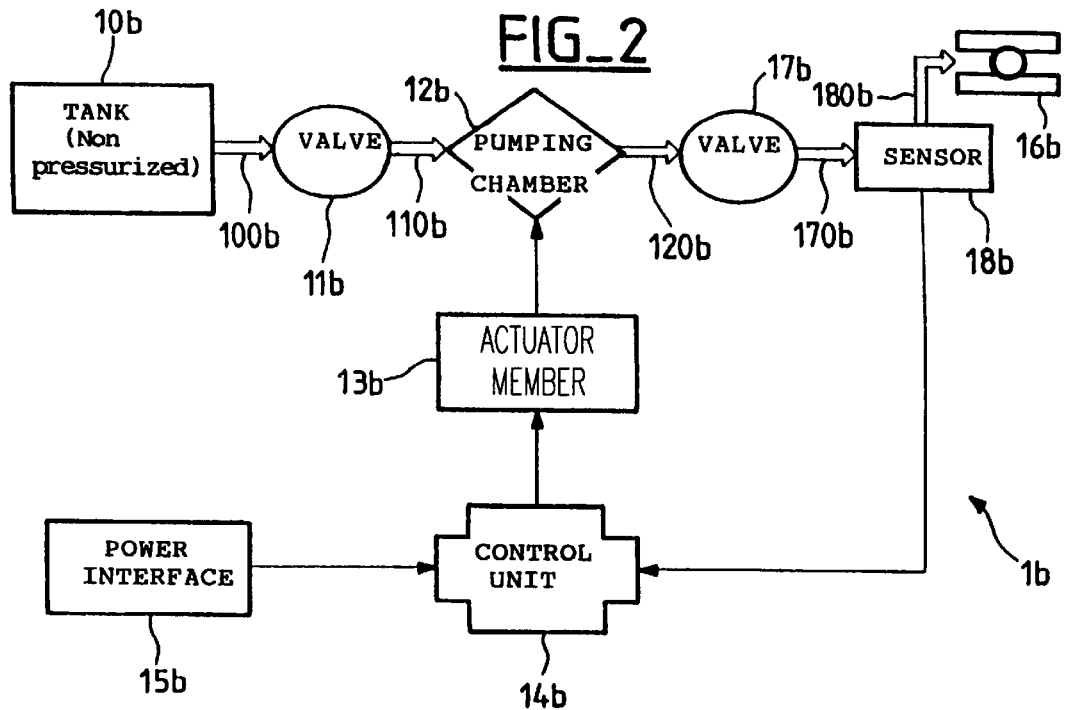
FIG_2

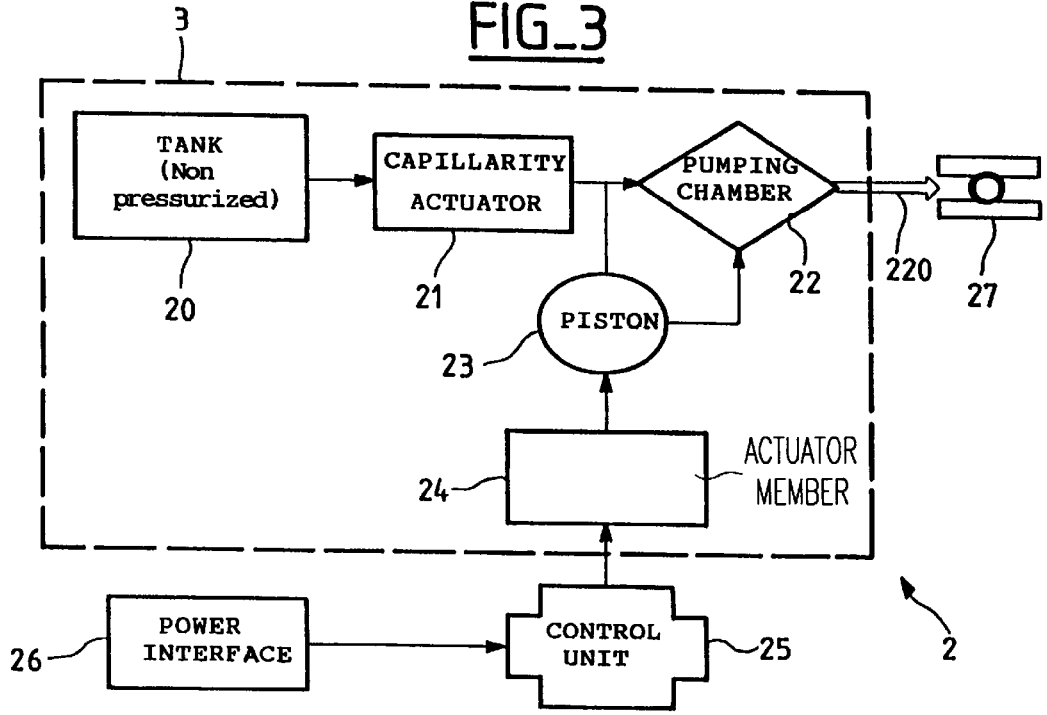
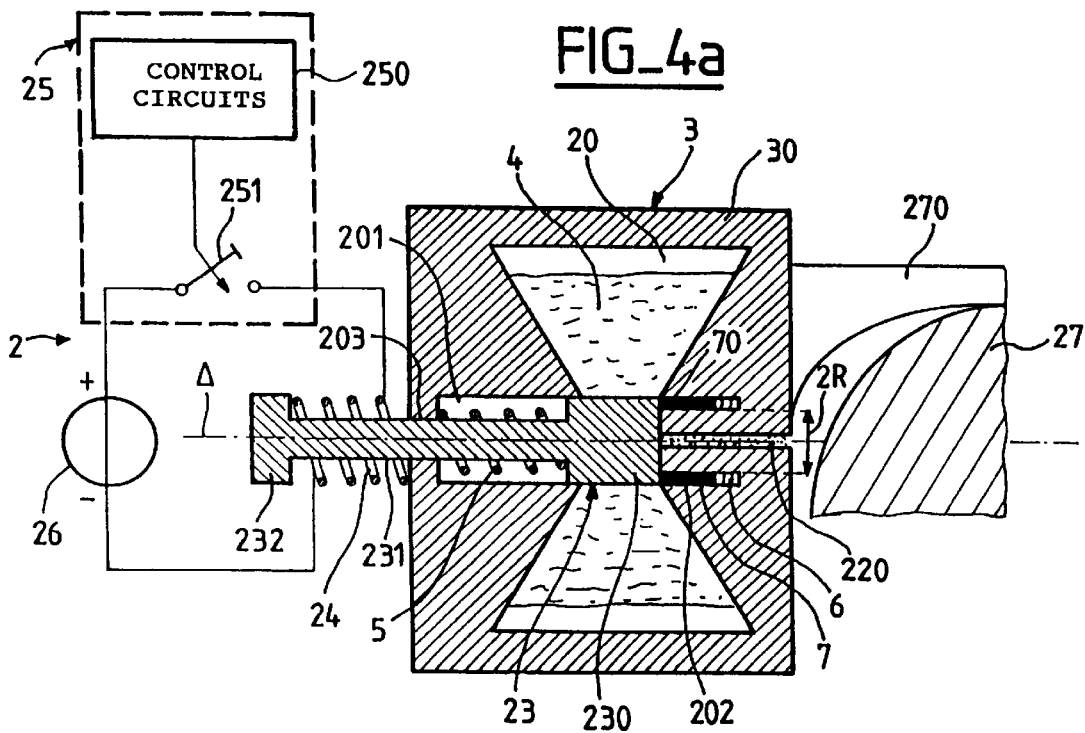

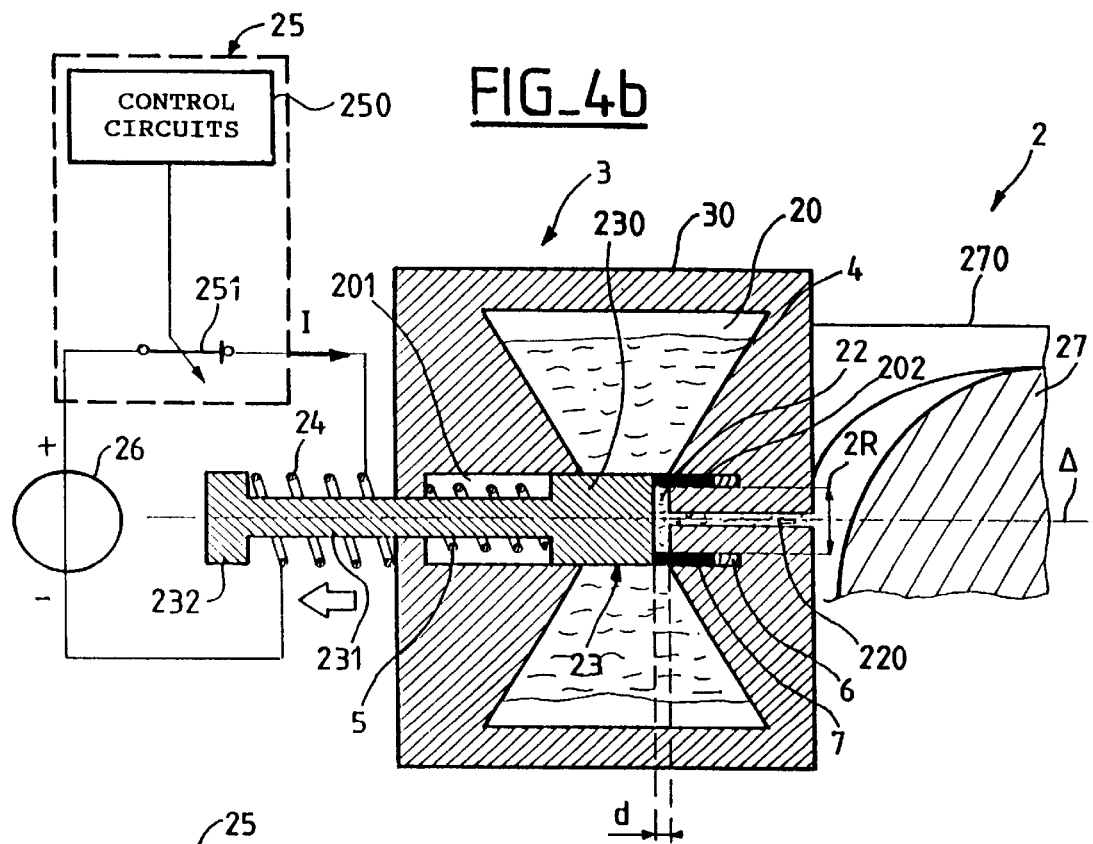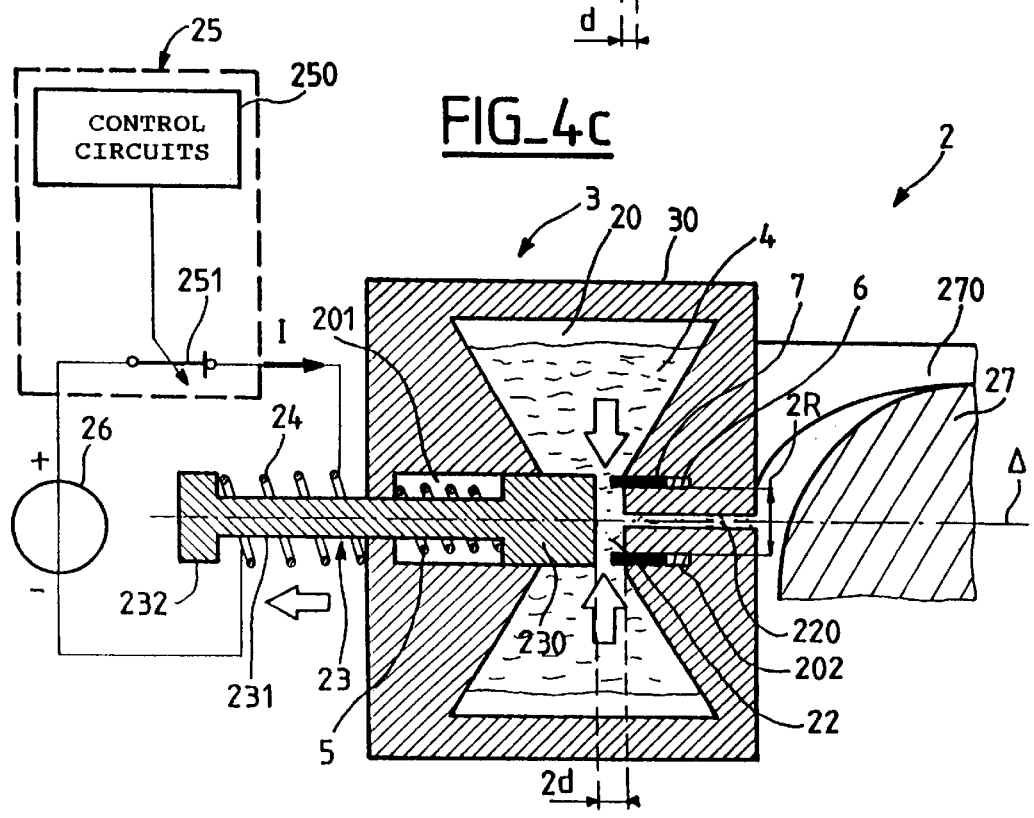

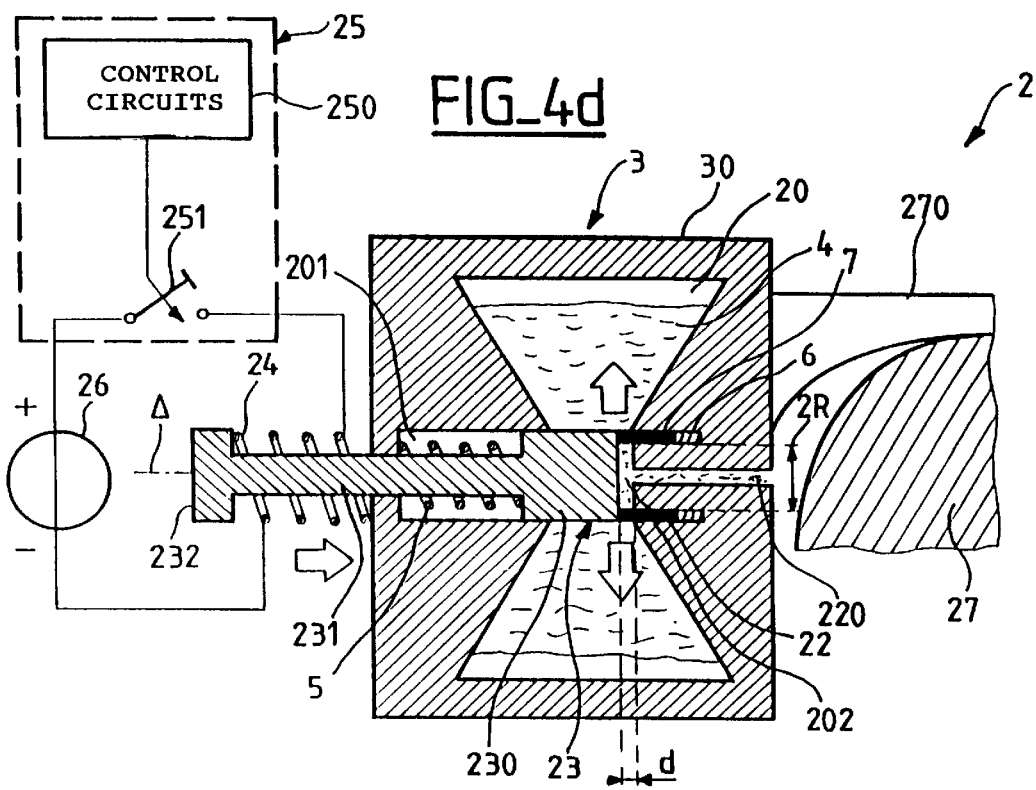
FIG_4d
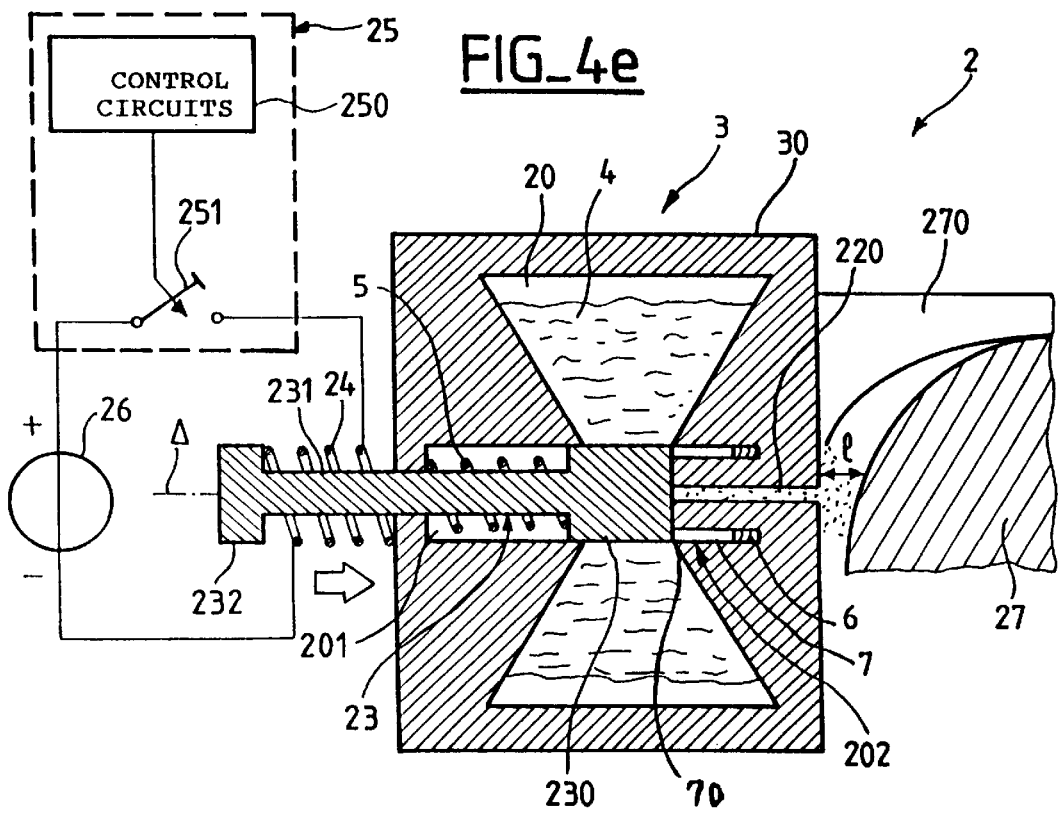
FIG_4e

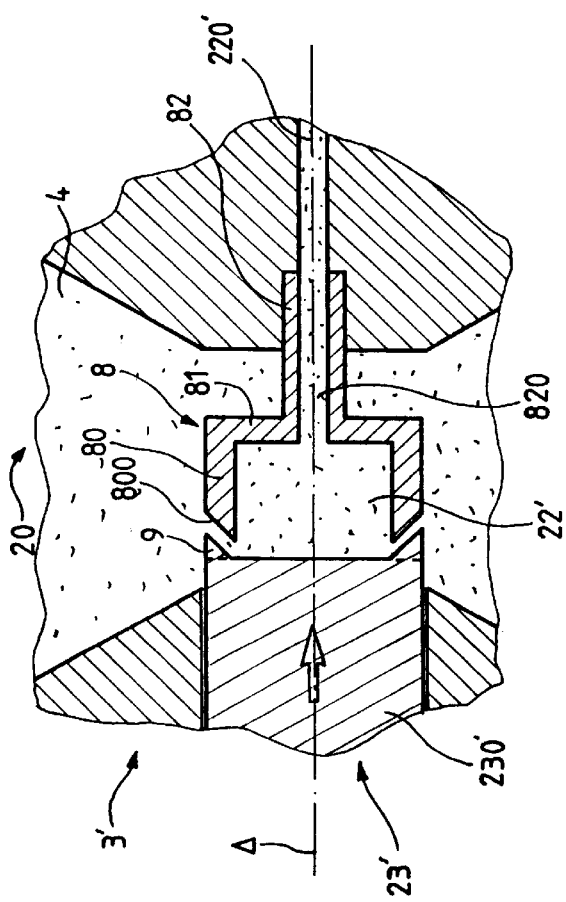
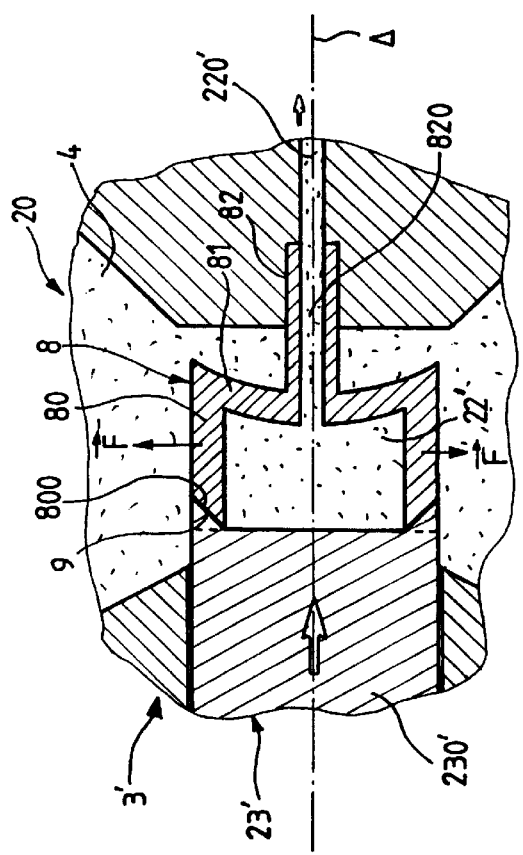

LUBRICATION SYSTEM FOR A MECHANISM, IN PARTICULAR FOR A ROTARY BEARING IN A SPACECRAFT

BACKGROUND OF THE INVENTION

The present invention relates to a lubrication fluid supply system for a mechanism. It relates more particularly to the lubrication of a rotary bearing on board a spacecraft, such as a satellite, a rocket, or a space vessel.

The precise control and good monitoring of oil supply, and more generally of lubrication fluid supply, in on-board mechanisms such as rolling bearings, are very critical for this type of applications. An insufficient supply may namely cause a degradation of the system to be lubricated, and even its jamming in the worst case. On the other hand, an excess supply of lubricant may cause the braking moment to be too large, which may additionally induce vibrations. This also can cause an increase in the pollution rate in the neighboring (optical, etc.) instruments, as a result of an evaporation and condensation phenomenon.

Two main categories of lubricating systems may be distinguished, based on their operating modes: the "passive systems" and the "active systems". A priori, an "ideal system" should belong to the second category. Furthermore, a feedback loop controller can be associated with it.

More precisely, the "passive" systems supply oil or a lubrication fluid, without any external controller. Such systems can for instance be based on the effect of centrifugal forces. To clarify the notions, considering the case of an inertia flywheel (used for instance in a gyroscope), it is an obvious inconvenience that the supply is dependent upon the rotation speed. A further inconvenience is that the intrinsic "feedback loop" action is opposite to the desirable action. Namely, if the flywheel tends to slow down, precisely because of the amount of lubricant supplied to a mechanism being insufficient, this causes a further reduction of the amount of oil supplied. In other words, this phenomenon is cumulative.

A correct operation, on the other hand, can be monitored in the active systems. Such systems are based on different principles.

A first type of systems comprises a pressurized, lubricant filled, tank. The tank is closed by a valve. The latter is controlled by a spring made of a shape memory alloy, or "SMA", which monitors the amount of lubricant flowing out of the tank, based on a pressure difference between the tank interior and the outside environment.

An other pressurized tank system, using a "Kaiser Eckel" type solenoid valve, is described in an article by Dennis W. Smith and Fred L. Hooper : "POSITIVE LUBRIFICATION SYSTEM", published in "The 24th Aerospace Mechanisms symposium", pp 243–258.

A second type of systems implements a micro-pump and works according to the same principle as an ordinary pump. An internal chamber is alternately filled by creating a depression and emptied by creating an overpressure. To this purpose, a high frequency actuator member, most frequently of a piezo-electric or electrostatic type, is used. The existing micro-pumps have sizes in the millimeter, or even micrometer ranges, and can be fabricated by silicon etching or stereolithography, for instance.

Those two lubrication system types, described in a more detailed manner hereinafter, however suffer from serious inconveniences, which also will be clarified.

An other system, based on an entirely different principle, was developed and described in an article of L. M. Dormant and S. Feuerstein : "Nylon Pore System", published in the "Journal of Spacecraft and Rockets", volume 13, No 5, May 1976, pp 306–309. This system implements oil impregnated, porous nylon blocks. Controlled heating of those blocks causes a certain amount of oil to be expelled, due to an expansion effect. It however was demonstrated that this system, because of capillarity effects, does not correctly operate.

In a more general way, no prior art system has been entirely satisfactory. Furthermore, presently existing systems, with the exception of the micro-pump system, have relatively large sizes.

There consequently is a need for a lubrication system offering both a small size and a very high reliability.

To clarify the notions, and without this limiting in any way the scope of the invention, the case of the lubrication of an inertia flywheel bearing (used for instance in a gyroscope) will be exposed herein. This application is interesting since it evidences the encountered difficulties. This device is used in most positioning control systems and the flywheel, for long-term missions, should revolve for periods of time currently longer than ten years.

Furthermore, the typical required performances and the environmental conditions are very severe. An non-exhaustive listing is given hereafter:

high vacuum: $10^{-3}$ to $10^{-4}$ bars (100 Pa to 10 Pa);

operation in a wide temperature range: from $-40°$ C. to $+65°$ C.

capacity to operate with very viscous lubricants: up to 20 Stokes ($2 \ 10^{-3}$ m$^2$/s), as a consequence of low temperatures);

a geometry allowing implementing the lubrication system close to the bearing: geometry typically inscribed in a 8×20×20 mm volume (but with a complex shape, irreducible to a simple cuboid);

a fluid volume to be delivered typically in the range of 2 to 3 cm$^3$;

a monthly dose typically in the range of 1 to 5 mm$^3$;

a 10 to 20 years duration, for long term missions;

a capacity to operate under a 0 g (0 m/s$^2$) acceleration;

an electric control interface needing no high voltage power supply, avoiding a.c. voltage, and only requiring a minimal power consumption;

a high resistance to vibrations while being launched into orbit, with the following typical levels: 50 $g_n$ (490 m/s$^2$) in the quasi-static conditions; 30 efficient $g_n$ (294 m/s$^2$) in the random conditions and 200 $g_n$ (1960 m/s$^2$) in cases of shocks of a typical 0.5 ms duration.

a resistance to very high-level radiations, typically 100 krad.

SUMMARY OF THE INVENTION

The object of the invention consequently is a lubrication system for on-board mechanisms which does not suffer from the prior art system inconveniences, some of which just were pointed out, meets the operating conditions imposed upon those mechanisms in the aerospace applications, and offers both a reduced size and a very high reliability, so as to make it compatible with long-term missions.

For this purpose, the system of this invention includes, in combination, a piston actuated by a spring, an shape memory alloy actuator member, a fluid lubricant tank, a pumping chamber with a capillarity effect, and a supply channel.

The object of this invention consequently is a lubrication system for a mechanism, comprising a non pressurized tank, containing a lubrication fluid, and a distribution channel for said fluid, opening through its first port into said tank and supplying through its second port said mechanism to be lubricated, characterized in that: it comprises a piston reciprocating inside the tank in translation along its longitudinal axis, so as to provide two determined states, a first state in which said piston obturates said first port of the distribution channel, and a second state in which said piston is at a determined distance from said first port of the distribution channel, so as to create a so called pumping enclosure, of a determined volume, communicating by capillarity in said second state with the tank, and allow said lubricating fluid penetrating therein, and control means for the piston causing a motion from said first state to said second state, so as to fill said pumping enclosure by capillarity effect, and a motion in the opposite direction from said second state to said first state, so as to expel via said distribution channel a determined volume of lubricating fluid towards said mechanism to be lubricated.

An other object of the invention is the application of such a system to the lubrication of a rotary bearing, onboard a spacecraft.

The system of this invention consequently offers several advantages, and among those:

absence of any pressurized tank no valve, just a simple piston which is not permanently exposed to pressure;

a very good monitoring of the amount of oil (or more generally of the lubrication fluid) being delivered, due to the operating mode implying the supply of volumetric doses;

independence from the (temperature dependent) viscosity of the fluid used, and quasi-independence from the most important parameters (time, temperature, pressure);

simple electric interface (no need for either a.c. voltages or high voltage power supply, or feedback control, or "intelligent" control circuits).

BRIEF DESCRIPTION OF THE DRAWINGS

This invention will be better understood and other characteristics and advantages will appear upon reading the following description, with reference to the appended figures of which:

FIG. 1 is a bloc diagram illustrating an example of a lubrication system of a first state of the art type;

FIG. 2 is a bloc diagram illustrating an example of a lubrication system of a second state of the art type;

FIG. 3 is a bloc diagram illustrating an example of a lubrication system of this invention;

FIGS. 4a to 4e illustrate a practical example of a lubrication system according to a first embodiment of the invention, and the various phases of its operation; and FIGS. 5a and 5b illustrate a practical example of a lubrication system according to a second embodiment of the invention and two phases of its operation.

For a better understanding of the lubrication system of the present invention and its advantages, two types of state of the art lubrication systems, mentioned in the preamble of the present description will first be described, with reference to FIGS. 1 and 2, and their inconveniences will be exposed.

DETAILED DESCRIPTION OF THE FIGURES

FIG. 1 is a bloc diagram illustrating an example of a lubrication system 1a, according to a first state of the art embodiment, having a pressurized tank 10a filled with the lubrication fluid. This tank communicates with a distribution channel 110a via a closing valve 11a. The pressure inside the tank 10a is measured by a pressure sensor 12a. The measures generally are converted, by the sensor 12a, into electric signals and forwarded to a control unit 14a. The latter also receives electric supply signals generated by a power interface 15a. Depending upon the value of the measured pressure, the power signals in their turn are transmitted to an actuator member 13a comprising a shape memory alloy spring, of the two-position, or ON/OFF, type. This member controls the position of the valve 11a in order to supply lubricant to the member to be lubricated, for instance, a bearing 16a. Actuating the actuator member 13a results from an electric current, i. e. the power signals supplied by the power interface 15a, being supplied to it.

The just described system 1a does offer some advantages: simplicity, no particular needs for the electric interface and no communication channels between components, with the only exception of the fluid distribution channel 110a.

It however suffers from numerous inconveniences, in particular for the application which the invention is aiming at, and among those:

the use of a pressurized tank, which for reliability reasons is undesirable in the case of space applications;

the use of a valve (closing valve) under permanent pressure, which particularly for long term missions might cause losses (leaks) and reliability problems;

a poor knowledge of the amount of fluid being supplied to the mechanism to be lubricated, which results from the absence of any obvious correlation between the flow of lubricant and the opening time in the precise operating conditions of the system at this instant; the main causes are the lubricant pressure variations over time and as a function of temperature, the very large magnitude variations of the lubricant viscosity with temperature, and the possibility of the flow being a non linear function of the valve opening time;

an increased complexity if a feedback monitor loop is used for a better mastering of the previous parameter: in this case, the system requires at least the presence of a pressure sensor in the tank (as illustrated in FIG. 1) and probably also a flow sensor, as well as the presence of some "intelligence" in the control unit 14a;

and again a poor mastering of the amount of lubricant being delivered to the mechanism 16a as a function of an additional parameter: the thermal inertia of the shape memory spring constituting the actuator member 13a.

For this latter point, it is obvious that the opening time of the pressurized tank is very short and must be well monitored, which is not easy for many reasons. In the first place, the thermal inertia especially with high vacuum conditions is relatively high, which makes the instantaneous closing of the valve impossible. In the second place, the time necessary to reach the shape memory alloy threshold temperature also depends upon the temperature. However, as already pointed out, the latter may considerably vary (typically from −40° C. to +65° C.).

As a conclusion, it clearly appears that the lubrication system just described is not, or only poorly, adequate for the applications which this invention is aiming at.

FIG. 2 is a bloc diagram illustrating an example of a lubrication system 1b, according to a second state of the art embodiment. The system 1b includes a non pressurized tank lob communicating with the chamber of a micro-pump 12b, via a first valve 11b and two communication channels: 100b (at the outlet of the tank 10b) and 110b (at the inlet of the chamber of the micro-pump 12b), respectively, and actuator member 13b. The micropump 12b communicates with the distribution channel 180b of the lubrication fluid and the mechanism to be lubricated 16b (for example a bearing) via a second valve 17b, two communication channels, 120b and 170b, located on either side of the second valve 17b, and a flow sensor 18b, on the inlet of the distribution channel 180b.

The system further includes a high frequency actuator member, which delivers periodic signals to the micro-pump 12b and in its turn is under the control of the control unit 14b. The latter can be supplied with electrical signals by a power interface 15b. The lubricant flow measure by the sensor 18b is converted into electric signals, fed back to the control unit 14b.

This system offers two important advantages as compared to the previous one: it requires no pressurized tank and, because of the use of a micro-pump, allows reaching a small size. It however also suffers from many inconveniences, among others:

the presently known micro-pumps are unable to correctly operate with very low ambient temperatures, mainly due to the lubricant viscosity increase;

the use of two low performance valves: it namely is well known that the problems linked to poor reliability and to leaks are more severe in the case of micro-valves;

the actuator properties, such as the natural frequencies, and the flow through the channels, which are highly dependent upon the viscosity, i.e. upon the temperature, cause uncertainties about the amount of lubricant delivered;

an increased complexity if a feedback control loop is used for a better mastering of the previous parameter: in this case, a flow sensor as illustrated in FIG. 2 is necessary;

the need for several additional transmission channels (represented by double lines) between components; and most micro-pumps require a high-tension a.c. power supply, which results in using high frequency, piezoelectric or electrostatic, actuators.

As a conclusion, it also appears that the second, just described, lubrication system type also is not, or only poorly, adequate for the applications which the present invention is aiming at, so much the more that a complete pumping system is not really necessary in the large majority of space applications, as will be shown later. In fact, all that is needed is a supply of well-mastered doses of lubrication fluid, at determined time intervals.

A system according to the invention will now be described, with reference first to the block diagram of FIG. 3.

The lubricating system, hereinafter referred to as 2, mainly comprises a tank filled of a fluid 20, like the previous non pressurized system, an actuator or capillarity injector 21, a pumping chamber 22 and a piston 23, acting as a valve.

The piston 23 is under the control of an actuator member 24, hereinafter called actuator, of the ON/OFF type, advantageously consisting of a memory shape alloy spring, as in the case of the first state of the art system represented in FIG. 1.

It should be understood that these five components, as will be shown later on a practical embodiment, can be integrated into a single physical set, as suggested by the dashed lines of FIG. 3. This set, hereinafter referred to as 3, constitutes what will hereinafter be designated as the lubrication device proper.

The actuator 24 receives from a control unit 25 electric signals consisting of a d.c. voltage, which in its turn originates from an electrical power interface 26.

As will be shown in a more detailed manner with a practical implementation example, the control unit 25 can be reduced to a strict minimum. It essentially comprises a two-position switch, which allows or blocks a d.c. current through the shape memory alloy of actuator 24 so as to heat it up, and periodic control members for this switch, according to a predetermined program or to control signals sent by an earth station for instance. No feedback loop or particular "intelligence" is needed in the control unit 25.

To clarify the notions, we shall suppose that the mechanism to be lubricated 27 consists of a gyroscope bearing, on-board a satellite for a long-term mission. The pumping chamber 22 delivers the lubricant to this mechanism 27 via a distribution channel 220.

With reference to FIGS. 4a to 4e, en example of a first embodiment of this lubrication system of the invention will now be described, as well as the main phases of its operation, within the scope of the application just pointed out. Elements which are common to one or several of the figures will bear the same reference numbers and will again be described only if needed.

In the example illustrated in these figures, the lubrication device 3, shown in longitudinal section, includes a substantially cylindrical main body 30. The interior of the cylindrical body 30 is for a major part occupied by an annular tank 20, containing the lubrication fluid 4, advantageously of a biconical shape, with the flared part being near the wall of body 30 and the narrower part being towards the longitudinal symmetry axis A of the body 30. The tank 20 in fact opens into a cylindrical channel 201, with a rotational symmetry around the longitudinal axis A, which prolongs the tank 20 on a first side of the body 30 (the left hand part, in the described example). On the other side of body 30 (the right hand side part), the tank 20 communicates, on the one hand with the distribution channel 220, and on the other hand with an annular auxiliary chamber 202.

The head 230 of a piston 23 is disposed in the channel 201 and this head has the same section as the section of this channel. The wall of the body 30, situated between the channel 201 and the exterior of the body 30, is pierced with an orifice 203, with a diameter smaller than that of the head 230 of the piston 23. This piston has an axis 231 that passes through the orifice 203 opening outwardly in the wall of the body 30, arid ends by an abutment 232. Coaxially with the axis 231, between the wall of the body 30 and the head 230 of the piston 23, a first helical spring is disposed, being compressed and pushing the piston 23 towards the right hand side (in the described example) and consequently closing the inlet to the distribution channel 20. Between the wall of the body 30 and the abutment 232, a second helical spring which precisely constitutes the actuator 24 is disposed. This spring is made of shape memory alloy, as indicated previously.

In the annular chamber 202, a hollow cylindrical element 7 has been disposed, the wall thickness of which is substantially equal to the distance between both walls of the annular chamber 202, or at least slightly smaller than this distance, so that it can be reciprocated in translation inside this annular chamber 202. Finally a cylindrical spring 6 is disposed between the bottom of the annular chamber 202 and the hollow cylindrical element 7. This spring consequently tends to push back the hollow cylindrical element towards the head 230 of the piston 23, according to modes to be described hereinafter.

The control unit 25 is represented schematically. It essentially comprises a two-position ("open-closed") switch 251, and electronic control circuits 250 for this switch 251. The power interface includes a d.c. voltage source 25, connected across the spring 24 via the switch 251, so as to inject a current in this spring when the switch 251 is closed. Depending upon the ohmic resistance of the spring 24, the amplitude of the current through it is higher or lower, which causes a temperature increase. This heating up causes a variation of the geometrical shape of the element, in this case the length of the spring 24, as will be shown hereinafter.

Referring more precisely to FIG. 4a, the latter is seen to represent a phase which will arbitrarily be called "phase I" of the lubrication cycle. Let us start with the hypothesis that system 2 already was activated several times, in a relatively remote past, so that some lubricant already was distributed to bearing 27, in the manner described hereafter in relation with FIG. 4e.

During "phase I", which might typically last one month, switch 251 is in an open position. The electric supply circuit of spring 24 is interrupted, such that the latter is at the ambient temperature. Spring 24 consequently is not actuated (retracted state). The spring 5 pushes the head 230 of piston 23 back against the inlet to the distribution channel 220. No communication is consequently possible between the tank 20 and the channel 220. Incidentally, the cylindrical spring 20 also pushes the tubular element 7 back towards the head 230, against which it is pressed. The distribution channel 220 is filled with lubricant, with the exception of some losses caused by evaporation.

FIG. 4b illustrates "phase II" of the lubrication cycle. During this phase, which typically lasts a few seconds, the control unit 25 delivers a control signal to close the switch 251. A current, of a magnitude I, now flows through spring 24, and heats up the spring material by Joule effect. This heating up causes a deformation, in this case an expansion, of the spring 24. The latter will consequently lengthen and drive with it the abutment 232 and cause a leftward (in the described example) translation motion of the piston 23 along the axis A. The pressure exerted on the abutment 232 opposes both the accentuated compression of spring 5 and the viscosity forces (Haegen-Poiseuille forces) of the lubricant 4. The leftward motion of the piston 23 in the cylindrical channel 21 allows the cylindrical spring 6 to push the tubular element 7 back in this same direction, over a distance of a well defined magnitude d, but of a small value. This double motion (piston 23 and tubular element 7) results in creating, ahead of the piston, a cylindrical pumping chamber 22, with a diameter 2R equal to the internal diameter of the tubular element 7, and a height equal to d. The chamber volume consequently is $\pi R2d$. The fluid still present in the distribution channel 220 is sucked into this pumping chamber and partly fills it.

FIG. 4c illustrates "phase III" of the lubrication cycle. This phase III also typically lasts a few seconds. Electrical power is further applied across spring 24, which continues expanding as a result of the temperature increase and drives the piston further leftwards. The final extension of spring 24 is determined such that the maximal stroke of piston 23 is equal to 2d. The cylindrical spring 6 itself has a maximal extension equal to d, so that the stroke of the cylindrical element 7 is limited to this value. There follows that the pumping chamber 22, on the one hand, has doubled its volume ($2\pi R^2 d$) and, on the other hand, is now opened towards the tank 20: an annular overture of magnitude d. There follows that the capillarity forces being exerted allow a refilling of both the pumping chamber 22 and the distribution channel 220.

FIG. 4d illustrates "phase IV" of the lubrication cycle. This phase IV, as above, typically lasts a few seconds. The control circuits 250 generate a signal for opening the switch 215 (or cause the control signal to fall back to its initial state as in phase I). The current I through spring 24 is interrupted, so that the latter cools down. When the temperature reaches a predetermined threshold which depends upon the nature of the material which the spring 24 is made of, the latter recovers its original shape, i.e. a contracted state. The compression spring 5 relaxes and drives rightwards the head 230 of the piston 23, and progressively closes back the pumping chamber 22. The fluid present in the chamber 22 during the previous phase tends to preferentially escape towards the tank 20 during the translation motion of the head 230 of the piston 23. Namely, large viscosity forces oppose any entry of fluid into the distribution channel 220. At the end of phase IV, the head 230 of the piston 23 again presses against the tubular element 7, while the latter is still pushed back leftwards by the cylindrical spring 6. The pumping chamber 22 thus recovers the volume it had during phase II.

Finally, FIG. 4e illustrates "phase V" of the lubrication cycle. As above, this phase V also lasts a few seconds. The current is still interrupted and the spring 24 does not exert any substantial restoring force on the abutment 232 any more, and spring 5 continues to relax and drives leftwards with it the head 230 of the piston 23. Since the end of phase IV, this head presses against the cylindrical element 7, so that the motion of the head 230 of the piston 23 also drives rightwards this element, overcoming the opposing force of the cylindrical spring 6. Despite the above—mentioned viscosity forces, the fluid has no other possibility but escaping through the distribution channel 220. Advantageously, a "self-locking" seal 70 is arranged between the piston head 230 and the cylindrical element 7, in order to avoid any leak possibility.

There follows that a $\pi R^2 d$ volume, exactly equal to the volume of the pumping chamber 22 during phase IV, is expelled towards the bearing 27, i.e., more generally into the mechanism to be lubricated. It should be noted that the distribution channel 220 remains filled after this phase V, until a new lubrication cycle is initiated, i.e. typically a few weeks later.

It also should be noted that the outlet of the distribution channel 220 typically is disposed a very short distance 1 from the bearing to be lubricated, typically a distance on the order of 0.2 mm, which induces a large capillary effect. Advantageously, an envelope 270 is provided, surrounding this bearing and resting on the external wall of the body 30 of the lubrication device 3. For this reason, the volume of lubricant will very rapidly be supplied to the bearing 27, thanks to the capillary forces resulting from the small interstice existing between the bearing 27 and the envelope 270. Furthermore, since the inertia flywheel or the gyroscope continuously rotates in the example just described, it exerts an attraction effect, so that the lubrication is optimally executed.

To clarify the notions, we shall now describe an example of the practical embodiment and indicate the most important parameters attached to it, without this limiting in any way the scope of the invention.

The length of the distribution channel 220 is 15 mm and its radius is 0.2 mm. The length of channel 220 is arbitrary, in that that it strongly depends upon the precise application, i.e. upon the space available to reach the bearing 27. On the other hand, the choice of the radius can be made by referring to the results published in the article of Dennis W. Smith and Fred L. Hooper above-mentioned. This is an optimized value which allows limiting the volume of the tube constituting the distribution channel 220, small enough to obtain a capillarity effect, but sufficiently large to avoid impurities blocking the channel. Although the channel 220 is represented as rectilinear on FIGS. 4a to 4e, it can includes several bends to accommodate various geometries of the mechanism to be lubricated.

Experiments were made under severe operating conditions, i.e. at a very low temperature such that the oil viscosity is maximal. It namely is known that the oil viscosity very strongly increases when the temperature is very low (−45° C. for instance). Various oils available on the market may be adequate for the applications which the invention is aiming at: the main characteristics of two oils which can be used, namely "FOMBLIN", type "Z25" and "PENNZANNE", type "SFH X-2000", are indicated in "TABLE 1", appended to the present description.

Experiments were conducted with the first of these oils at a temperature of −45° C. At this temperature, the oil viscosity is 2000 cSt, which corresponds to the abovementioned requirements. Despite the small size of the components, the classical equations of fluid mechanics can be used, since those flows are very slow. The second abovementioned oil is even more sensible to low temperatures. Its viscosity reaches 80500 cSt at −40° C. In other words, the oil at this temperature is pasty. It consequently only can be used if very long operating times are accepted for each phase.

The length of the spring 5 is about 5 mm with a diameter of 4 mm. The same is true for the shape memory alloy spring 24. In an alternative not represented embodiment, the springs are not disposed in series. They, for instance, could be disposed coaxially, with one of them surrounding the other, which allows an even more compact realization. It then is sufficient to adapt their respective diameters.

The pumping chamber 22 (phase IV) must be filled by capillarity with a determined volume of lubricant 4, corresponding to the dose to be delivered. Its length d typically is equal to 0.3 mm, in the closed state (so 2d=0.6 mm, during phase III), which implies that the doses injected during phase IV are equal to 3.8 mm$^3$. It is quite possible to further reduce d so as to obtain smaller doses. It on the other hand is preferred not to increase the value of d above that previously indicated, in order to keep a large capillarity effect. If a larger amount of lubricant is necessary, the lubrication cycle (phases I to IV) can be repeated n times. Thus, n doses are injected instead of a single one.

The dynamics for the filling of the pumping chamber 22 can be calculated by reference to the Laplace equations related to the capillarity forces and fluid dynamics. As an example, the coating of the pumping chamber 22 is made of steel. In this case, and with the "FOMBLIN" oil, type "Z25", the above dynamics is of the order of 10 seconds (phase III).

The phase V determines the maximal force which the spring 5 must exert: it must oppose viscosity forces appearing in the distribution channel (Haegen-Poiseuille forces). The capillarity forces, the friction forces and the force exerted by the spring 6 are negligible. Typically, spring 5 produces a force of about 1 N in its maximal compressed state (phase III) and 0.5 N during phase I. This results in a time constant of 5 seconds for the above quoted "FOMBLIN Z 25" oil at −45° C.

Phase II is the one that determines the force of the shape memory alloy spring 24. The latter must oppose the force of the spring 5 in addition to the above-mentioned viscosity forces appearing in the distribution channel 220. As above, the capillarity and friction forces, as well as the forces exerted by spring 6 are negligible. A force of about 1.5 N is necessary to overcome the above-mentioned forces. This results in a time constant of 3 seconds to terminate phase II, here again with the "FOMBLIN Z 25" oil, at −45° C.

The shape memory spring 24 can for instance consist of a nickel-titanium alloy, a copper-zinc-aluminum alloy, or a nickel-titanium-copper alloy, those three alloys being the best known ones, to obtain the desired shape memory properties.

As an example, the shape memory spring was chosen with the following alloy as a basis: nickel 45%, titanium 45%, and copper 10%. The wire diameter is 0.29 mm and the inside diameter of the spring is 1.74 mm. The electric current necessary to obtain a 5 bars (5 105 Pa) pressure is in the range of 1 to 2 A under a normal pressure. Under vacuum, the magnitude of the necessary current is smaller.

The tank 20 is designed to contain at least 3 cm$^3$ of lubricant 4.

A critical point for tank 20 is that it must be guaranteed that the pumping chamber periphery always stays in contact with the lubricant, in the absence of any gravity, which constitutes one of the requirements pointed out for the applications of the invention is aiming at. Various solutions can be devised, among which:

providing a fluid excess and an appropriated geometry, guaranteeing that enough fluid always is in contact with the pumping chamber periphery until the end of the mission, in the absence of any gravity;

using a tank of a shape always leading the fluid towards the pumping chamber periphery, in the absence of any gravity: such a shape can be of a conical type (as the shape described with reference to FIGS. 4a to 4e), since the thermodynamic effects tend to push the fluid back against the smallest orifice;

using a diaphragm in the tank, which maintains the lubricant in a well defined zone and could exert some small thrust towards the pumping chamber periphery.

There are some other restraints, in particular those restraints caused by the vibrations encountered during the launching phase of the space vehicle and its being placed onto its orbit and the losses caused by evaporation (during phase I).

As regards the tank 20, one can also signal the fact that withdrawing a small lubricant volume progressively causes a depression state in its inside enclosure. This depression incidentally participates, in combination with a capillary effect, to the sucking of the fluid into the pumping chamber 22 towards the tank 20 during phase IV. It however might be necessary for some applications to restore the initial state at each cycle.

The vibrations particularly act on the piston 23 which is pushed back by the spring 5. Calculations have shown that this causes no actual problem, in spite of the relatively low rigidity of the spring 5 (typically 0.5 N/0.6 mm). The reason for it is the small mass of the piston 23 and the high viscosity of the lubricant in the distribution channel 27.

The lubricant losses by evaporation in the distribution channel 220 (during phase I) can be calculated by using the Langmuir equations. They are quite negligible when the viscosity of the lubricant is very high (which is the case of the "PENZANE" oil, type "X-2000", for instance). In the other cases, they remain acceptable.

It finally can be indicated that an uncertainty might exist about the dose of fluid supplied to the mechanism 27 to be lubricated. Namely, when the piston 23 starts its translation motion, during phase IV, the quasi-totality of lubricant 4 returns to the tank 20 since the high viscosity of the fluid in the distribution channel 220 opposes the fluid flow towards the latter. Nevertheless, at the end of the d magnitude motion (reached during phase IV, i. e. when the head 230 of the piston 23 is closest to the cylindrical element 7), the viscosity forces manifesting themselves in the distribution channel 27 compete with the other viscosity and turbulence forces, with the latter increasing so much the more that the head 230 of the piston 23 is closer to the cylindrical element 7. An uncertainty may result since supplying a dose of lubricant can then start earlier than forecast (i.e. before phase V). Even if the amount of the lubricant delivered can be calculated or measured, the latter strongly depends upon the viscosity, i.e. the temperature. This phenomenon is strongly dependent on the geometry of the pertinent component interfaces, in particularly the head 230 of the piston 23 and the cylindrical element 7.

Referring to FIGS. 5a and 5b, an example of the lubricant system according to the second embodiment, minimizing this phenomenon, will now be described.

Those figures illustrate two operating phases of the lubrication system, corresponding to the end of phase IV and the beginning of phase V, as described regarding the FIGS. 4d and 4e.

More precisely, only a fraction of the lubrication device proper is represented in FIGS. 5a and 5b, which fraction is designated by 3', and is the only one necessary to understand the features of this second embodiment.

According to this embodiment, referring again to FIGS. 4a to 4e, the pumping chamber 22, the cylindrical element 7, the annular chamber 202 and the spring 6, represented on these figures are integrated as a single component as explained hereafter.

In FIGS. 5a and 5b, the pumping chamber 22' is comprised of the interior of a pot shaped receptacle 8, with a cylindrical side-wall 80 and a flat bottom 81, while in the rest state. This flat bottom 81 is made of a resilient material and is prolonged by a tube 82 inserted into the wall 30' of the tank 3', to which it is mechanically fixed. The internal channel 820 in the tube 82 communicates, at a first end, with the interior of pot 8, which constitutes the pumping chamber 22', and, at a second end, with the distribution channel 220', which prolongs it. The outside diameter of the wall 80 is substantially equal to the diameter of the head 230' of the piston 23'. The latter is similar to the piston 23 of the first embodiment, except however that a crown 9, of a particular profile, advantageously consisting of an annular bevel shaped outwardly facing lip (axis Δ) is provided on the periphery of the head 230'. Similarly, the end of the cylindrical wall 80 is provided with a crown 800, of a complementary profile, advantageously an annular, also bevel shaped but outwardly facing, lip.

This arrangement insures that an automatic seal is created when the head 230' of the piston 23' comes close to the wall 80, which is the case at the end of phase IV, as illustrated on FIG. 5a.

During its rightward translation, the head 230', and more particularly the crown 9, consequently engages the crown 800 of the wall 80. If the translation motion continues (phase V), the bottom 81 of the pot 8 is deformed due to its resilience, as illustrated on FIG. 5b, since the head 230' of the piston 23' longitudinally pushes the wall 80 and since the central zone of the bottom 81 is held by the tube 82. The volume of the pumping chamber 22' decreases and the fluid initially present therein is expelled towards the distribution channel 220', via the internal conduct 820 of the tube 82.

There namely is no other way, and those skilled in the art easily understand that, the stronger the pressure reigning inside the pumping chamber 22' when it is closed and when the lips 9 and 800 are engaged, the better the sealing of the chamber 22 is. Namely, the internal pressure results, so far as the wall 80 is concerned, in forces F substantially orthogonal to the latter, with one of the effects of the latter being to firmly apply the lip 800 on the lip 9, which supposedly is rigid (the head 230' of the piston 23' being massive). The thus created seal consequently is "self-locking". This disposition allows an optimal monitoring of the doses of lubricant injected into the mechanism 27 (FIGS. 4a to 4e).

Upon reading the above description, it is easily ascertainable that the lubrication system of this invention perfectly reaches the objects it is aiming at and offers numerous advantages, among which:

the tank is not pressurized;

no closing valve is necessary, only a piston, which is not submitted to any permanent pressure (typically only a few seconds during a cycle lasting several weeks);

an excellent mastering of the amount of lubrication fluid delivered to the mechanism to be lubricated is obtained: those are "volumetric", perfectly defined doses (volume of the pumping chamber, in the closed state);

the system is independent from the viscosity of the fluid used and practically independent from all other parameters (time, pressure, temperature);

the electric interface is very simple: no high-voltage power supply or a.c. voltage, no feedback loop, no electronic circuits for processing complex signals;

and it is possible to reach a very reduced size, without suffering from the inconveniences of the micro-pump systems: the weight therefore also is reduced, which allows benefiting from launching savings and/or increasing the useful load of the launcher.

Those advantages can be obtained because the lubrication system of this invention, as was pointed out, does not operate a continuous pumping but delivers well-defined doses at determined intervals. The system benefits from the absence of "time" restraints: there is no need for the fluid to be instantaneously delivered. The process may, without any inconvenience, last several minutes or more. The environmental restraints do influence the duration of the lubricant supply process, but do not influence the amount of lubricant delivered, thanks to the specific dispositions of the invention, as opposed to the presently known state art systems.

It however must be clear that the invention is not limited only to the embodiments explicitly described, particularly in relation with FIGS. 3 to 5b.

In particular, the figures quoted as examples (sizes, etc.) or the nature of the material used were indicated with the single object of clarifying the main characteristics of this invention and could in no case limits its scope. The above-mentioned parameters are strongly dependent upon the specific applications being considered and are a part of a simple technological choice, well within the knowledge of those skilled in the art.

It also should be clear that the invention, although being well suited for long term missions in particular for lubricating mechanisms with rotary members (such as gyroscope or inertia flywheel bearings), could not be limited to this type of applications. It applies to all types of space or high altitude aeronautics missions and, generally, to all cases in which it is desired to lubricate a mechanism in severe environment conditions, particularly at a very low temperature, under a very high vacuum and/or with a very low gravity.

TABLE I

| Characteristics | Oil types | |
| --- | --- | --- |
| | PENNZANNE SPH X-200 | FOMBLIN Z25 |
| Specific mass | 0.84 | 1.85 |
| Molar weight | 910 | 9500 |
| Viscosity   −40° C. | 80500 | 1842 |
| (in cSt)   +40° C. | 108 | 92 |
| +100° C. | 14.6 | 28 |
| Vapor pressure | $8.5\ 10^{-3}$ (25° C.) | $<5\ 9^{-12}$ (20° C.) |
| (in Torr) | $1.5\ 10^{-19}$ (75° C.) | $<9\ 10^{-9}$ (93.3° C.) |
| Surface tension (in mN/m) | 31 (20° C.) | 24 (20° C.) |
| Wetting angle as a function of the material (in °) | very strongly non-wetting on steel 440C | 27.5° steel 10–15° aluminium 7–10° PTFE |

What is claimed is:

1. Lubrication system for a mechanism, comprising a non pressurized tank, containing a lubrication fluid, and a distribution channel for said fluid having a first port and a second port, opening through the first port into said tank and supplying through the second port said mechanism to be lubricated, wherein said lubrication system comprises:

a piston reciprocating inside the tank in translation along its longitudinal axis, so as to provide two determined states, a first state in which said piston obturates said first port of the distribution channel, and a second state in which said piston is at a determined distance from said first port of the distribution channel, so as to create a pumping enclosure, of a determined volume, communicating by capillarity in said second state with the tank, and allow said lubricating fluid penetrating therein, and control means for said piston causing a motion from said first state to said second state, so as to fill said pumping enclosure by capillarity effect, and a motion in the opposite direction from said second state to said first state, so as to expel via said distribution channel a determined volume of lubricating fluid towards said mechanism to be lubricated.

2. System according to claim 1, wherein said tank comprises a main body having a first wall with a channel opening into the interior of tank, said first port of said distribution channel opens into a second wall opposite to said first wall, said piston is disposed in said channel and comprises a head having a section the same section as a section of the channel, and said piston control means comprise a first spring which pushes said head back towards the first port of the distribution channel and a shape memory actuator member, taking when actuated a first predetermined geometric shape so as to exert a driving force on the piston to bring it into said first state, and taking when non activated a second predetermined geometric shape so as to authorize the piston returning to said first determined state.

3. System according to claim 2, wherein said shape memory actuator member is a helical spring with turns, said control means of the piston further comprise an electric power supply and a switch disposed in series with said turns, so as to heat up, when said switch is closed, said helical spring by allowing a flow of an electric current, and so as to cause a swing from said second predetermined geometrical shape to said first predetermined geometrical shape by means of a thermal effect lengthening of the spring, of a determined magnitude, and a return to said second predetermined geometrical shape is obtained through spontaneous cooling of said material below a determined threshold, when said switch is open and disconnects said electric power supply (26).

4. System according to claim 3, wherein said switch is under control of electronic circuits which according to a determined cycle generate opening and closing control signals so as to obtain a succession of said first and second states of said piston, and to supply said mechanism to be lubricated, at predetermined time intervals, with doses of lubrication fluid of a determined volume.

5. System according to claim 2, wherein said second wall of the tank includes an annular chamber, wherein said annular chamber contains a tubular element and a cylindrical spring disposed between said tubular element and a bottom of said annular chamber, so as to push back said tubular element in order for it to press against said head of piston, wherein under the thrust of said cylindrical spring, said tubular element is driven inside said tank in a translation motion of a limited magnitude when said piston is in said second state, so as form a transverse wall of said pumping enclosure, and wherein said limited magnitude is such that an annular overture remains between the head of said piston and said tubular element, so as to allow filling said pumping enclosure by capillary effect.

6. System according to claim 5, wherein said determined distance between the piston and said first port is equal to twice said translation motion of a limited magnitude.

7. System according to claim 2, wherein said pumping enclosure consists of a pot with a cylindrical wall, closed by a bottom disk made of a material with resilient properties, wherein said bottom has a central opening orifice prolonged by a rigid tube, inserted in said second wall of tank, and communicating with said distribution channel, wherein an end of said cylindrical wall of the pot has a profile of a first determined shape, wherein said head of piston has an annular profile of a second determined shape, complementary to said first determined shape, so that they engage into each other and constitute a seal when the head of piston nears said pot, upon returning from said first state to said second state, and wherein the translation motion causes resilient deformation of said bottom and the expulsion of the lubrication fluid present in said pumping enclosure toward said mechanism to be lubricated, via said rigid tube and the distribution channel.

8. System according to claim 7, wherein said profiles of determined shapes are bevels, with the bevel of the annular profile of the head of piston facing inwardly and the bevel of the profile of the end of said wall of pot facing outwardly.

9. System according to claim 1, wherein the interior of said tank has a biconical revolution shape around said longitudinal axis.

10. System according to claim 1, wherein said lubrication system is adapted to be mounted in a spacecraft, having a rotary bearing to be lubricated.

* * * * *

UNITED STATES PATENT AND TRADEMARK OFFICE
CERTIFICATE OF CORRECTION

PATENT NO. : 6,085,871

DATED : Jul. 11, 2000

INVENTOR(S): Boris KARAMATA

It is certified that an error appears in the above-identified patent and that said Letters Patent is hereby corrected as shown below:

On the Title page, Item [73], the Assignee information is incorrect.
Item [73] should read as follows:

--- [73] Assignee: Agence Spatiale Europeenne,
    Paris Cedex, France        ---

Signed and Sealed this

Eighth Day of May, 2001

Attest:

NICHOLAS P. GODICI

*Attesting Officer*    *Acting Director of the United States Patent and Trademark Office*